(No Model.)
F. C. ALMONT.
GRAIN EVENER FOR SELF BINDING HARVESTERS.
No. 516,421. Patented Mar. 13, 1894.
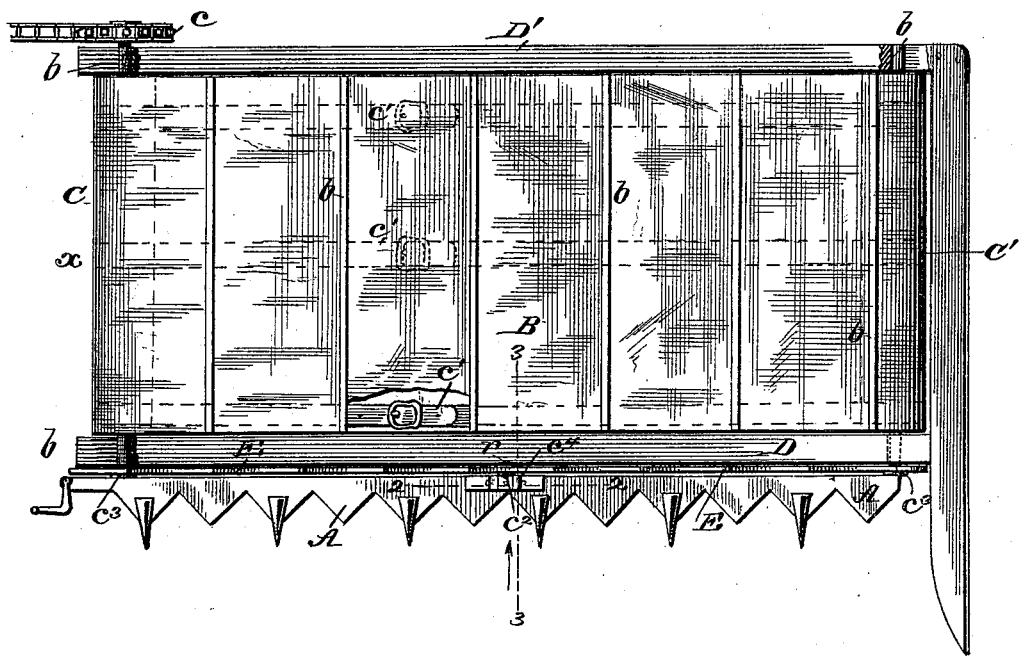
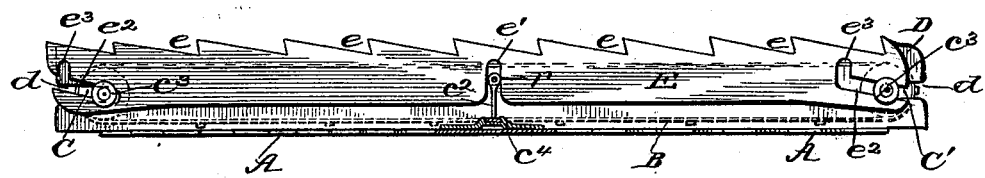
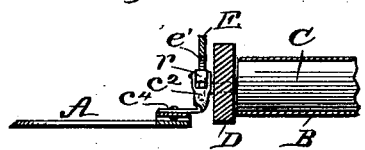
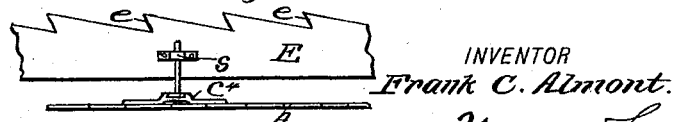
WITNESSES:
Fred G. Dieterich
Edw. W. Byrn
INVENTOR
Frank C. Almont
BY Munn & Co
ATTORNEYS.

UNITED STATES PATENT OFFICE.

FRANK. C. ALMONT, OF SIBLEY, IOWA, ASSIGNOR OF ONE-HALF TO WALTER B. STEVENS, OF SAME PLACE.

GRAIN-EVENER FOR SELF-BINDING HARVESTERS.

SPECIFICATION forming part of Letters Patent No. 516,421, dated March 13, 1894.

Application filed October 16, 1893. Serial No. 488,279. (No model.)

*To all whom it may concern:*

Be it known that I, FRANK. C. ALMONT, residing at Sibley, in the county of Osceola and State of Iowa, have invented a new and useful Improvement in Grain-Eveners for Self-Binding Harvesters, of which the following is a specification.

In self binding harvesters the grain and straw as it is cut by the sickle falls upon a horizontal endless apron in rear of the sickle and is carried laterally or in a direction at right angles to its length to an elevator apron which raises it to the binding device. This grain does not always fall across the horizontal apron in true right angular position, and by reason of the greater weight of the heads of grain this end is liable to get in advance of the butts as the grain is carried by the apron to the elevator, leaving the butts or ends near the sickle to drag behind which involves an entanglement of the straws and more or less embarrassment in elevating and binding the grain as well as loss of grain due to the falling out of these misplaced straws.

My invention is designed to overcome this difficulty, and incidentally also to clear the cutter bar and apron of accumulated grass or rubbish, and to these ends it consists in the peculiar construction of an evener bar arranged parallel to and immediately behind the sickle, to which evener bar is imparted a vibratory motion that causes it to advance the butt ends of the straws so as to straighten the same, and enable the horizontal apron to feed them evenly with the straws lying parallel to each other, and at right angles to the direction of movement of the apron, as will be hereinafter more fully described.

Figure 1 is a plan view of the horizontal apron, the sickle bar, and my evening devices arranged parallel with and between the same, with parts broken away. Fig. 2 is a front edge view of the cutter bar and platform partly in vertical section through line 2—2 of Fig. 1, looking in the direction of the arrow. Fig. 3 is a cross section through line 3—3 of Fig. 1 and Fig. 4 a detail of a modification.

In the drawings A represents the sickle of any harvester.

B is the endless horizontal carrier apron which is arranged to travel in a direction parallel to the sickle and lies immediately behind the same so that the grain and straw as it is cut by the sickle falls to the rear directly across the apron, and is transported thereby laterally to the elevator apron which occupies a position at the end $x$ of the horizontal apron. This elevator is of the usual kind and need not be shown and described, it being sufficient to say that it is another endless apron arranged in an inclined position to carry the grain up to the binding devices.

The horizontal apron B is provided with slats $b$ crosswise its length to give it hold upon the grain and said apron is distended between rollers C C', one of which C is provided beyond its journals with a sprocket wheel $c$ by which motion is imparted to the same through a chain belt from some of the driving gears of the machine to cause the apron to travel behind the sickle in a direction parallel thereto with its top part moving toward the elevator. The journals of the rollers are held in horizontal open slots $d$ in the frame bars D D' and are held therein against coming out by the tension of the apron whose ends are united by a series of straps $c'$, which may be taken up or let out to regulate the tension.

E is my evener bar. This is made preferably of sheet metal, but may be made of wood, and is constructed on its upper surface with a series of ratchet teeth $e$, which point toward the elevator. This evener bar lies immediately in front of the horizontal apron B and behind the sickle, and its office is to advance, by a vibratory motion, the butt ends of the straw which lie next to the sickle. To impart the proper vibratory movement to this evener bar it has formed in its lower edge a vertical slot $e'$ in which plays a roller $r$ attached to an arm $c^3$ which is fastened to the sickle so that the reciprocating motion of the sickle is imparted to the evener bar causing its teeth to act upon the butt ends of the straw to feed the latter toward the elevator. As the evener bar moves backward it is made to descend slightly to carry the teeth under the straw, and as it moves forward again it rises to cause the teeth to more positively engage the straw. This movement is controlled in direction by inclined slots $e^2$ $e^2$ in the evener bar which move over flanged rollers $c^3$ $c^3$ that are secured to the front side of frame bar D by means of axial bolts, which flanged rollers serve to guide the evener bar as aforesaid. At the forward ends of these slots $e^2$ there are other vertical slots $e^3$ $e^3$. When it is not desired to use the evener, it is disconnected from the roller $r$ and arm $c^2$ and pushed slightly to the rear until slots $e^3$ come over the flanged rollers $c^3$, in which position the slots $e^3$ allow the evener bar to drop down out of sight remaining there stationary and out of use.

To secure the arm $c^2$ to the sickle its lower horizontal end is made widest at the bottom, like a dovetail, and is slipped into a keeper $c^4$ having a corresponding under cut recess, and is there secured by a screw or bolt. This keeper is detachably connected to the sickle.

Instead of having the lower edge of the evener bar slotted at $e'$ to receive the connecting arm with roller, a strap keeper or staple $s$ may be fastened to the evener bar, as seen in Fig. 4, to receive and connect with said arm. This point of connection between the sickle and evener bar may be either about the middle of the same or at one end, or the evener bar may be connected to the pitman which operates the sickle.

This attachment may be placed upon the platform of any self binder at a very small cost, and will bring the straws of grain evenly to the entrance of the elevator. It also acts as a picker or clearer at all times for dislodging the fine grasses and rubbish that are liable to accumulate at the rear edge of the sickle.

In making use of my invention I would have it understood that I do not confine myself to the precise construction and arrangement of parts, as they may be varied somewhat without departing from the spirit of my invention.

Having thus described my invention, what I claim as new, and desire to secure by Letters Patent, is—

1. The combination with the sickle and horizontal traveling apron in a self binding harvester; of a separate vibrating evener bar for the grain straws, arranged in horizontal position but in a vertical plane parallel with and between the sickle and apron, guides for controlling its motion attached to front frame bar, and a loose drag connection with the sickle, substantially as and for the purpose described.

2. The combination with the sickle and horizontal traveling apron in a self binding harvester; of a separate vibrating evener bar for the grain straws arranged between the sickle and apron and having teeth upon its upper edge, and inclined slots $e^2$ $e^2$ at its end means for imparting a longitudinally vibrating motion, and flanged rollers $c^3$ $c^3$ attached to the front of the frame bar and arranged in the inclined slots for causing the bar to descend on the backward movement and rise on the forward movement, substantially as and for the purpose described.

3. The combination with the sickle and horizontal traveling apron in a self binding harvester; of a toothed evener bar arranged between the same and means for vibrating it, the said evener bar having guide slots $e^2$ with vertical extensions $e^3$ to permit the evener bar to descend to an inoperative position, substantially as and for the purpose described.

4. The combination with the sickle and horizontal traveling apron in a self binding harvester; of a toothed evener bar arranged between the same, and having both a longitudinally reciprocating and an up and down motion and a loose drag connection between the sickle and evener bar arranged as described to both impart the reciprocating motion and permit the up and down motion substantially as and for the purpose described.

5. The combination with the sickle and horizontal apron with distending and actuating rollers in a self binding harvester; of a toothed evener bar arranged in a vertical plane between the sickle and apron and having inclined slots embracing guide rollers and provided with a vertical slot $e'$ on its under side, and an arm connected to the sickle and having an anti-friction roller arranged in the vertical slot of the evener bar substantially as and for the purpose described.

6. The combination with the sickle and horizontal apron in a self binding harvester; of the toothed evener bar E having inclined slots $e^2$, with vertical extensions $e^3$, and having also slot $e'$ in its lower edge, the detachable arm $c^2$ with dovetail seat and anti-friction rollers, and the undercut or dovetail keeper $c^4$ fixed to the sickle substantially as and for the purpose described.

FRANK. C. ALMONT.

Witnesses:
FRANK PRESSWELL,
W. W. BROOKS.